United States Patent
Chung

(10) Patent No.: US 7,289,176 B2
(45) Date of Patent: Oct. 30, 2007

(54) SINGLE PANEL, ACTIVE MATRIX, FULL COLOR, CHOLESTERIC LCD CELL CONFIGURATION

(75) Inventor: David B. Chung, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/326,636

(22) Filed: Dec. 19, 2002

(65) Prior Publication Data

US 2004/0119926 A1 Jun. 24, 2004

(51) Int. Cl.
G02F 1/1335 (2006.01)
G02F 1/1343 (2006.01)

(52) U.S. Cl. ...................... 349/115; 349/141
(58) Field of Classification Search ........... 349/141, 349/115, 106, 143
See application file for complete search history.

(56) References Cited

U.S. PATENT DOCUMENTS

| 3,854,751 | A | * | 12/1974 | Haas et al. ............... 349/168 |
|---|---|---|---|---|
| 4,037,927 | A | * | 7/1977 | Krueger ..................... 349/84 |
| 4,231,640 | A | * | 11/1980 | Funada et al. ............. 349/82 |
| 4,861,143 | A | * | 8/1989 | Yamazaki et al. ......... 349/85 |
| 5,946,060 | A | * | 8/1999 | Nishiki et al. ............. 349/48 |
| 6,097,465 | A | * | 8/2000 | Hiroki et al. .............. 349/141 |
| 6,630,982 | B2 | * | 10/2003 | Li ............................. 349/175 |
| 6,909,484 | B2 | * | 6/2005 | Chung et al. .............. 349/115 |
| 2003/0038912 | A1 | * | 2/2003 | Broer et al. ............... 349/122 |

* cited by examiner

*Primary Examiner*—Dung T. Nguyen
(74) *Attorney, Agent, or Firm*—Marger Johnson & McCollom, P.C.

(57) ABSTRACT

A liquid crystal display system and cell configuration is disclosed. The element has a first substrate, having a first substrate electrode and a second substrate having a second substrate electrode approximately parallel to the first substrate. In between the two substrates is sandwiched a cholesteric liquid crystalline material. The pitch of the cholesteric material can be controlled by at least two interdigitized electrodes, electrically separated from each other, arranged on the second substrate.

10 Claims, 3 Drawing Sheets

SINGLE PANEL, ACTIVE MATRIX, FULL COLOR, CHOLESTERIC LCD CELL CONFIGURATION

BACKGROUND

Liquid crystal displays (LCD) typically have two substrates, one or both of them being transparent, between which is sandwiched a liquid crystalline material that blocks or transmits light. The liquid crystalline material is generally twisted nematic. Twisted nematic displays pass or reflect incident light, while cholesteric displays usually reflect light.

The liquid crystalline material responds to applied electric fields. Cholesteric materials switch between a reflective state referred to as the planar cholesteric and a transparent state referred to as the focal conic state. When the molecules align in the planar cholesteric state in response to an electric field, they reflect light of a particular wavelength. The wavelength of the reflected light is proportional to the pitch distance of the material.

Generally, a cell with a given material will have a pitch distance corresponding to red, green or blue. Conventional approaches provide separate elements of each color. The separate elements may be stacked upon one another to generate the full color reflected light output. Alternatively, the three elements may be located next to each other spatially, with the combination of their colors being manipulated by optics, including color filters. Either of these approaches reduces the brightness of the display.

Even with these limitations, cholesteric displays have advantages over other types of LCDs, especially for mobile applications. Being reflective, they do not require power hungry back lights. Bistable cholesteric displays will remain in whichever state they are placed, without refresh, and even upon removal of power. This further reduces the need for power.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
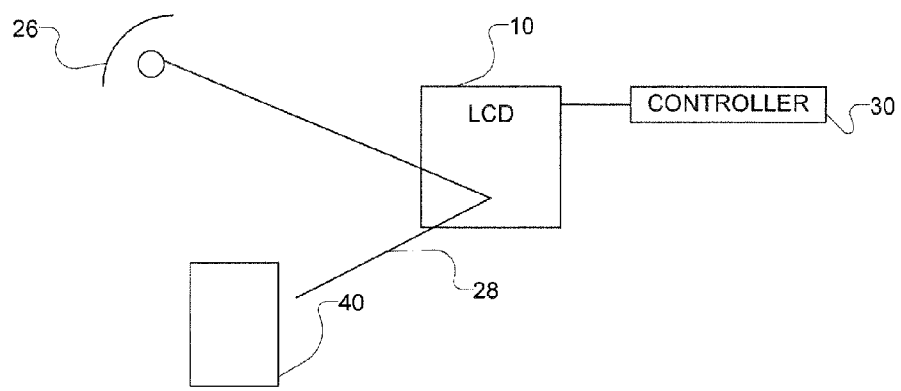
FIG. 1 shows an embodiment of a display system.

FIG. 1 shows an embodiment of a display system with a cholesteric LCD display panel. The light source 26 illuminates the cholesteric LCD display panel 10. Each cell in the display panel is individually controllable to reflect light of a predetermined color. The pitch distance of the cholesteric material within each element determines the color. The system will typically transmit images to the eye of a user 40. The light is reflected off the LCD panel such that the reflected light 28 is of a different color.

The controller 30 may control the activation of each element of the panel, turning each one ON and OFF, as well as controlling the voltage applied to create a transverse, or horizontal field. As will be discussed further, the transverse field manipulates the pitch distance for each element, changing the wavelength of the reflected color. An image that requires a picture element to be green, for example, would result in manipulating the voltages on the transverse field to cause the cholesteric material to reflect light of an approximate wavelength of 560 nanometers. The pitch distance, p, for green would be:

$$p = \frac{\lambda_0}{n} = \frac{560}{n}, \text{ where } n = \frac{n_\parallel + n_\perp}{2}.$$

Over a given period of time, such as a frame interval, which is $\frac{1}{60}^{th}$ of a second, the pitch of a pixel may be changed to red or blue, or both, 'tuning' the color of the pixel to be an intermediate color, a color other than red, green or blue. The human eye integrates the red, green and blue colors into a spot of the intermediate color. The controller 30 would be responsible for this color alteration of the reflected light by controlling the voltages on the interdigitized electrodes. The controller may be a general-purpose processor, a digital signal processor, a graphics controller, etc., as examples.

Figure 2:
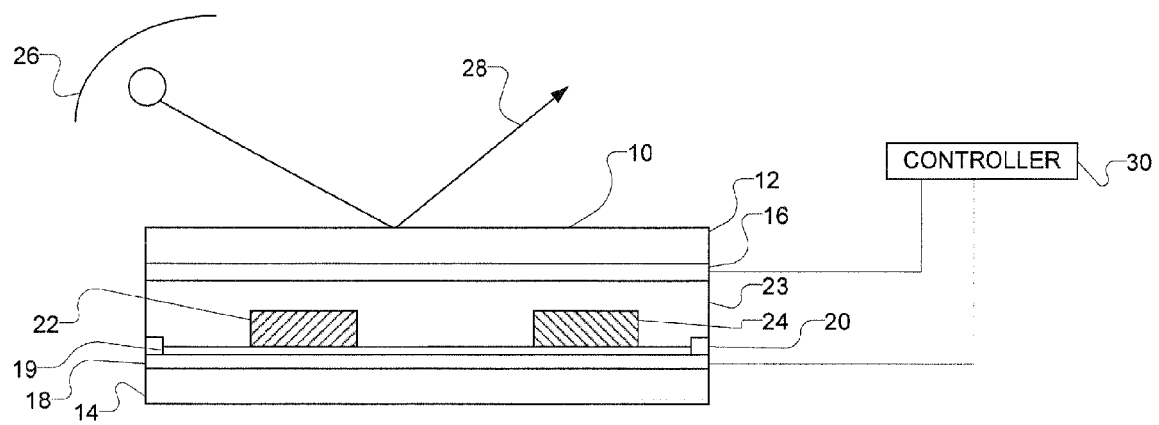
FIG. 2 shows a cross-sectional view of a cholesteric display element with interdigitized electrodes.

"FIG. 2 shows a cross-sectional view of an element of the display panel 10. The element is formed between a first substrate 12 and a second substrate 14. Disposed upon the first substrate 12 may be a first substrate electrode 16. Similarly, disposed upon the second substrate 14 maybe a second substrate electrode 18. In an active matrix display, a switching transistor that is typically within the second substrate, or underneath it in a portion of the panel not shown controls each individual element. However, electrical connections to the transistor can be seen at 20. Also arranged on the second substrate 14 are at least two interdigitized electrodes. An insulating layer 19 provides electrical isolation between the second substrate 18 and the interdigitized electrodes. The term 'interdigitized' as used here means that the two electrodes are physically interleaved, but electrically separate. In one embodiment, the interdigitized electrodes may actually face each other, however this configuration is considered an alternative method of interdigitizing the electrodes. This will become clearer with reference to FIGS. 4-7. The controller 30 may be electrically coupled to the substrate electrodes."

Of the two electrodes, one is designated to have applied to it a first voltage potential and the other is designated to have applied to it a second voltage potential. However, in one embodiment of the invention, there are multiple interdigitized electrodes. Alternating electrodes may be connected to the first potential and the other alternating electrodes may be connected to a second potential. The control of the two different potentials results in different electric fields. The different electric fields result in different pitch distances, in turn resulting in different wavelengths of reflected light.

To operate each display element to cause it to produce a picture element (pixel) of the resulting image, the elements must first be activated. In an active matrix display, the addressing transistor, usually a thin-film transistor such as 20, typically does this. When activated, the transistor causes an electric field to be generated between the first substrate electrode 16 and the second substrate electrode 18. Generally, this may be accomplished by electrically coupling the gate of the transistor to the second substrate electrode and the source of the transistor 20 electrically coupled to the first substrate electrode.

In response to this electric field, referred to here as the vertical electric field, the liquid crystalline material 23 may reflect or transmit light. Since the cholesteric material is reflective, it may reflect only that light of a particular wavelength. The interdigitized electrodes may also by activated by another switching transistor or circuit of transistors. However, the interdigitized electrodes would be activated when the substrate electrodes are not. If the interdigitized electrodes were activated coincidentally with the substrate electrodes, the transverse electric field generated by the interdigitized electrodes would have diminished effect. A unique property of bistable cholesteric liquid crystalline material is that it retains whichever state, planar cholesteric or transparent, to which it is switched by a field even after the field is removed. Therefore, the transverse electric field controlled by the interdigitized electrodes can operate on cells after the vertical electric field is out of synch.

The interdigitized electrodes are activated with applied voltages that may vary in accordance with voltage settings determined by the controller. The alternating electrode or electrodes will be activated with one voltage and the other electrode or electrodes with another to control the pitch. The pitch may be altered during a given frame interval to produce an intermediate color, or 'set' at the beginning of the interval to produce a pure red, green or blue spot with no mixing of other colors.

It is possible that no first substrate electrodes are necessary. In some embodiments, it may be possible to control the pitch and the activation of the liquid crystalline material with just the interdigitized electrodes on the second substrate. In this embodiment, the electric field created may have to be further manipulated to activate the liquid crystalline material.

Figure 3:
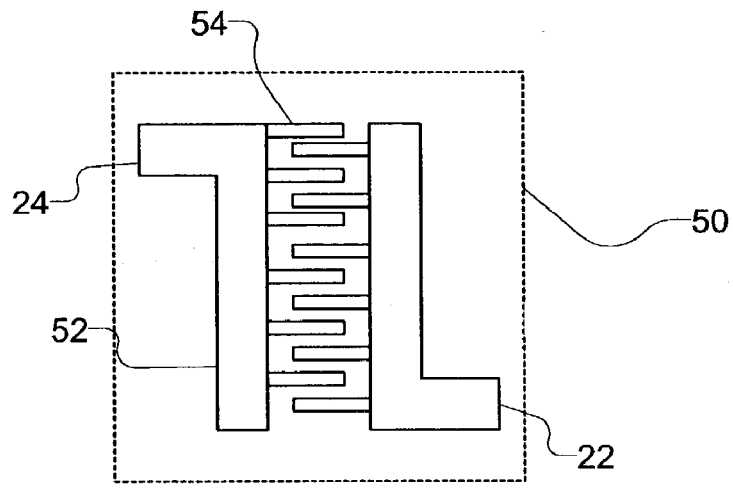
FIG. 3 shows a top view of an embodiment of a cholesteric display picture element having interdigitized electrodes.

FIG. 3 shows a more detailed embodiment of an interdigitized electrode configuration. With element 50 having interdigitized electrodes 22 and 24. Each electrode, such as 22, has 'teeth' such as 54 and a lead 52. In this embodiment electrode 22 has multiple teeth oriented with a first orientation, and electrode 24 has multiple teeth oriented with a second orientation. This configuration is referred to as the 'comb' configuration. The interdigitized electrodes may have opposing orientations, as shown in FIG. 3, essentially 'pointing at each other.'

The lead portion of the electrode 22 may have applied to it a voltage of a first potential, while the lead portion of electrode 24 may have applied to it a second potential. In one embodiment, the second potential is the negative of the first. For example, the first potential may be 5 volts, and the second would then be −5 volts. It is the control of both the magnitudes of the voltages as well as the relationship between them that manipulates the strength and orientation of the electric field.

The interdigitization of the electrodes may result in better control and more uniform alignment of the material in the element. This in turn would increase the purity of the color, as well as its intensity, as more light will be reflected in the desired wavelength. If the electric field generated by the interdigitized electrodes is too weak, not all of the liquid crystalline material may reflect the desired wavelength of light, which reduces the intensity of the desired light and contaminates it with whatever wavelength of light is reflected.

Figure 4:
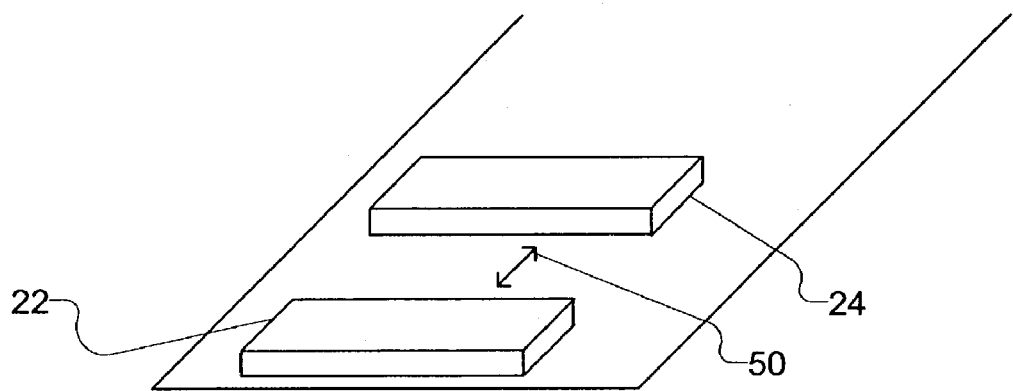
FIG. 4 shows an embodiment of an interdigitized electrode configuration.

FIGS. 4-7 show different configurations of the teeth portions of the interdigitized electrodes. In FIG. 4, a perspective drawing of the second substrate is shown with the teeth portions of the interdigitized electrodes. The vertical extent of these teeth has been exaggerated for better understanding of embodiments of the invention, as these teeth are essentially flat. Similarly, the lead portions of the electrodes have been removed for a clearer view of the teeth. These would be the comb configuration. The width and distance between the teeth may be as small as 2 micrometers. The voltages on the electrodes 22 and 24 control the transverse electric field shown by the arrow 50.

Figure 5:
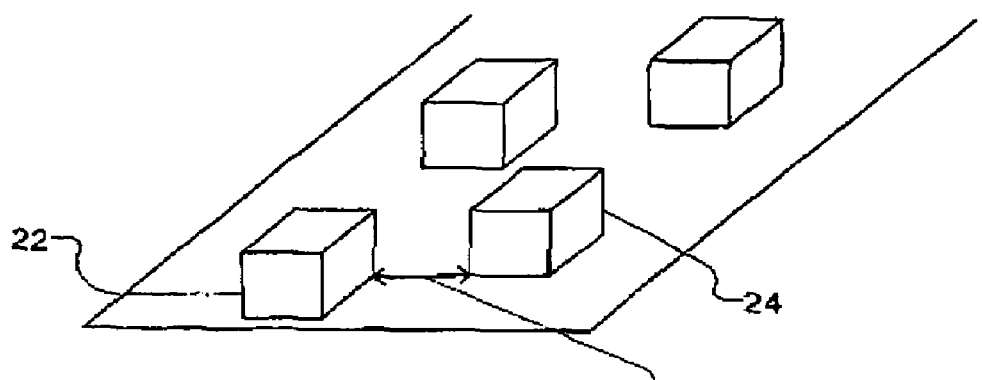
FIG. 5 shows an alternative embodiment of an interdigitized electrode configuration.

FIG. 5 shows an alternative to the relatively wide, thin teeth. In this embodiment, the interdigitized electrode teeth are not as wide and thicker. This will be referred to as the 'dam' configuration.

Figure 6:
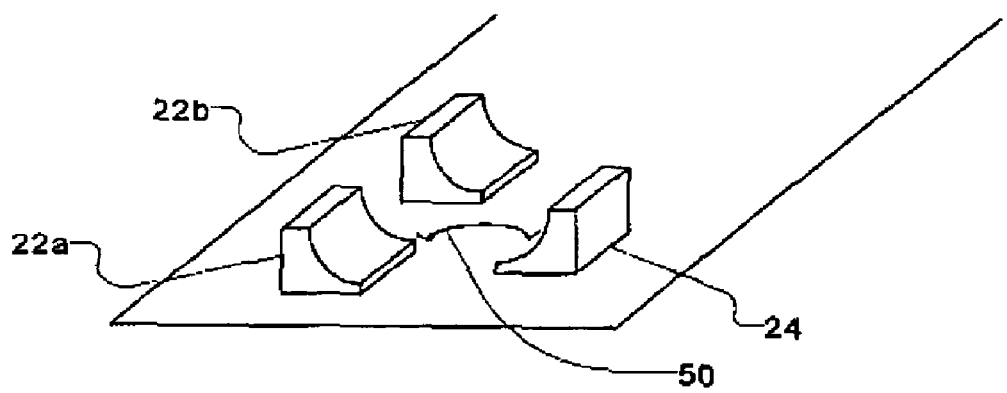
FIG. 6 shows an alternative embodiment of an interdigitized electrode configuration.
Figure 7:
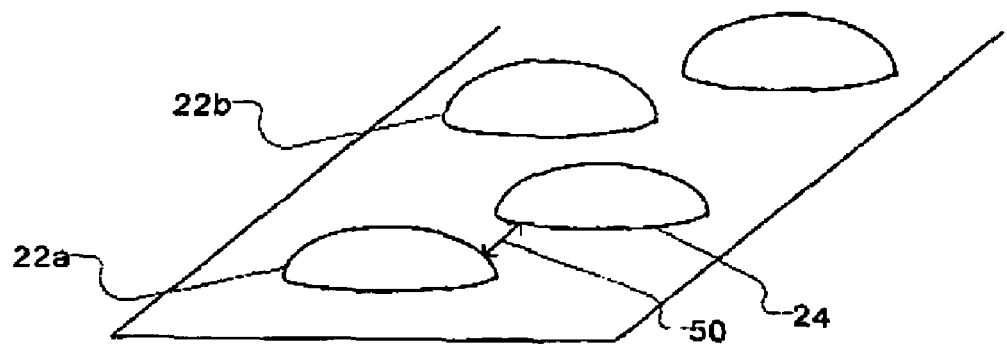
FIG. 7 shows an alternative embodiment of an interdigitized electrode configuration.

FIGS. 6 and 7 show rounder teeth configurations, with FIG. 6 showing a dish configuration and FIG. 7 showing a dome configuration. Using rounder structures may cause some undesirable variations, as the strength of the electric field will vary with the distance between the two opposing teeth. As both the dish and dome configuration show, the top of the respective geometries have points that are further away from the corresponding opposing electrode than the bottom of the electrodes. In FIGS. 6 and 7, the interdigitization results in a field being set up between electrodes 22a and 24, and between electrodes 22b and 24. The arrow 50 on FIG. 6 shows the general orientation of the electric field in these embodiments.

The specific choices of electrode teeth shape, spacing between both the teeth and the electrodes on each side, the spacing between electrodes of one orientation and electrodes of the other orientation, the number of interdigitized electrodes per electrode, as well as the number of rows of electrodes are left up to the system designer. The specifics will depend upon the manufacturing processes and the materials used for the electrodes as well as the cholesteric material.

In some instances, the manufacturing process may be easier to implement using fairly rectangular electrode teeth. Formation of the electrode teeth may be done by depositing the metal layer that will form the electrode teeth, depositing a patterning layer such as photo resist, and patterning the patterning layer form the electrode teeth. Once the photo resist is removed from the appropriate portions of the metal layer, the exposed metal may be etched to form the electrodes and teeth. Etching processes may result in teeth that are substantially rectangular. However, there is no limitation to the shape of the electrodes within the scope of the invention.

Thus, although there has been described to this point particular embodiments for a method and apparatus for providing interdigitized electrodes for a cholesteric LCD, it is not intended that such specific references be considered as limitations upon the scope of this invention except in-so-far as set forth in the following claims.

What is claimed is:

1. A liquid crystal display system, comprising:
   a first substrate with a first substrate electrode;
   a second substrate substantially parallel to the first substrate, the second substrate including a second substrate electrode;
   a bistable, cholesteric liquid crystalline material disposed between the first and second substrates;

at least two interdigitized electrodes, electrically separated from each other and arranged on the second substrate; and a controller coupled to the first and second substrate electrodes and the interdigitized electrodes, the controller to control a color reflected by the liquid crystal display system by controlling a first voltage on a first lead of at least two interdigitized electrode teeth and a second voltage to a second lead of at least two interdigitized electrode teeth to control a pitch distance of the bistable, cholesteric liquid crystalline material, wherein the pitch distance determines the color reflected by the liquid crystal display system; and controlling a reflection state of the bistable, cholesteric liquid crystalline material by controlling a voltage different between substrate electrodes on the first and second substrate electrodes.

2. The liquid crystal display system of claim 1, the system further comprising a thin film transistor to activate the system.

3. The liquid crystal display system of claim 1, the first substrate further comprising a transparent material.

4. The liquid crystal display element of claim 1 wherein the controller can alternate the display system between having electric fields perpendicular to and the parallel to the first and second substrates.

5. The liquid crystal display system of claim 4, the first and second voltage potentials to create the electric field.

6. The liquid crystal display system of claim 1, wherein the teeth of a first orientation coupled to the first lead are electrically coupled together and teeth of a second orientation coupled to the second lead are electrically coupled together.

7. The liquid crystal display system of claim 1, wherein the interdigitized electrode teeth have a shape selected from the group comprising: comb, dam, bowl and dome.

8. A method of operating a display element, the method comprising:

activating an addressing transistor causing the display element to switch on;

controlling a color reflected by the element by controlling a first voltage on a first lead of at least two interdigitized electrode teeth and a second voltage to a second lead of at least two interdigitized electrode teeth to control a pitch distance of a bistable, cholesteric liquid crystal material, wherein the pitch distance determines a the color reflected by the element;

controlling a reflection state of the bistable cholesteric liquid crystalline material by controlling a voltage difference between substrate electrodes on two substantially parallel substrates containing the liquid crystalline material; and alternating the application of voltages between the interdigitized electrodes and the substrate electrodes.

9. The method of claim 8, the method further comprising manipulating the first and second voltage potentials to alter the pitch distance, causing the color reflected by the element to change.

10. The method of claim 8 wherein one of the voltages is a ground potential.

* * * * *

UNITED STATES PATENT AND TRADEMARK OFFICE
CERTIFICATE OF CORRECTION

PATENT NO. : 7,289,176 B2  Page 1 of 1
APPLICATION NO. : 10/326636
DATED : October 30, 2007
INVENTOR(S) : David B. Chung It is certified that error appears in the above-identified patent and that said Letters Patent is hereby corrected as shown below:

column 6 line 16 "determines a the color reflected" should read --determines the color reflected--

Signed and Sealed this

Twenty-fifth Day of March, 2008

JON W. DUDAS
*Director of the United States Patent and Trademark Office*